No. 690,885. Patented Jan. 7, 1902.
J. M. SONTAG.
BROODER.
(Application filed Nov. 19, 1900.)
(No Model.)
Fig. 1.
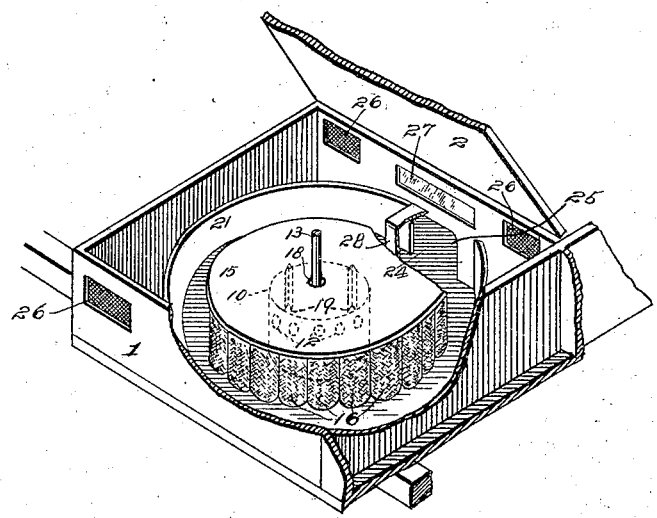
Fig. 3.
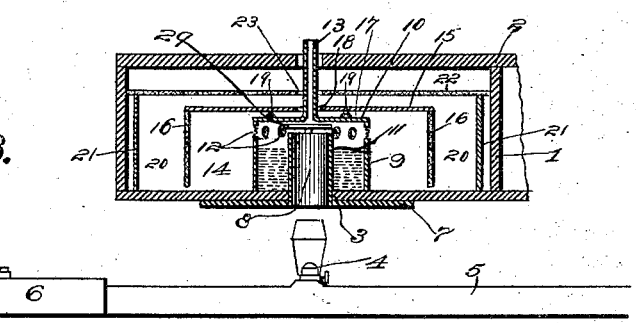
Fig. 2.
Witnesses
John M. Sontag, Inventor.
By C. A. Snow & Co.
Attorneys
THE NORRIS PETERS CO., PHOTO-LITHO., WASHINGTON, D. C.

UNITED STATES PATENT OFFICE.

JOHN M. SONTAG, OF ST. CHARLES, ILLINOIS.

BROODER.

SPECIFICATION forming part of Letters Patent No. 690,885, dated January 7, 1902.

Application filed November 19, 1900. Serial No. 36,952. (No model.)

*To all whom it may concern:*

Be it known that I, JOHN M. SONTAG, a citizen of the United States, residing at St. Charles, in the county of Kane and State of Illinois, have invented a new and useful method and system of arranging and heating brooders and brooder systems for raising poultry, water-fowl, and other fowls, said brooder systems consisting of one or more brooders located inside or outside of a brooder-house or other building for the purpose of housing said brooders, of which the following is a specification.

The invention relates to improvements in brooders for raising poultry, water-fowl, and the like.

The object of the present invention is to improve the construction of brooders and to provide a simple, inexpensive, and efficient one adapted to supply warm moist air and to afford perfect ventilation and capable of preventing young chickens and the like from being injured by being crowded into angles or corners.

The invention consists in the construction and novel combination and arrangement of parts hereinafter fully described, illustrated in the accompanying drawings, and pointed out in the claims hereto appended.

In the drawings, Figure 1 is a perspective view of a brooder constructed in accordance with this invention. Fig. 2 is a horizontal sectional view of the same. Fig. 3 is a vertical sectional view.

Like numerals of reference designate corresponding parts in all the figures of the drawings.

1 designates an approximately rectangular casing having a hinged top 2, adapted to be raised, as indicated in Fig. 1 of the drawings, to afford access to the interior of the brooder, and the said casing is provided at its bottom with an opening 3. Beneath the opening of the casing is arranged a lamp or burner 4, which is supplied with oil or other liquid by a tube 5, extending from a reservoir 6. The brooders in practice are designed to be arranged in a series, and the tube 5 extends the entire length of the same, the reservoir being located at one end of the tube. One or more of the burners may be lighted, and the temperature of the brooders composing the series may be varied to adapt the same to the size and other conditions of the chickens.

The bottom of the casing is protected by a sheet 7, of asbestos or other suitable material, and the heat and other products of combustion pass upward through the central passage 8, formed by an annular reservoir 9, composed of inner and outer vertical cylindrical concentric walls, a connecting bottom, and a top 10. The inner vertical wall 11 terminates short of the top 10 to provide a space for the passage of a greater portion of the products of combustion which flow outward over the water contained within the reservoir. The upward passage of the hot air through the reservoir causes a draft, and the air as it is carried upward is heated and becomes moist in passing over the water, and a certain amount of carbonic-acid gas is absorbed by the same. The outer wall of the central reservoir is provided at its top with apertures 12, covered with wire-gauze or other suitable material to prevent smoke and soot from passing through them, and a vertical pipe or flue 13 extends upward from the center of the top of the reservoir to carry off the surplus heat.

The warm moist air escapes into a central circular compartment 14, formed by a disk or plate 15 and depending strips 16, of fabric or other suitable material which is adapted to partially confine and prevent a too-rapid escape of heat. The disk or plate which forms the top of the central compartment is spaced from and supported by the top of the central reservoir. The intervening space 17 between the disk or plate 15 and the top of the central reservoir permits the escape of the hot air, and the said plate 15 is provided with a central opening 18 for this purpose. The disk or plate is preferably spaced from the reservoir by a pair of bars 19, V-shaped in cross-section; but any other suitable means may be employed for this purpose.

The central compartment is arranged within an annular chamber 20, formed by an approximately cylindrical wall 21 and a fabric covering or top 22, having a central opening 23 for the escape of hot air. The lid 2 is also provided with a central opening, and the vertical tube or flue extends through the central opening of the plate or disk 15, the fabric top 22, and the lid 2. The cylindrical wall avoids corners and angles and effectually prevents the brood from crowding into a corner and smothering or otherwise injuring some of the chickens. The casing is provided with an opening or door 24, leading to an inclosure 25, which may be covered or otherwise and which is designed for the purpose of permitting the brood to expose themselves to a greater or less extent to the outside atmosphere. The casing is provided above the cloth cover or diaphragm 22 with ventilator-openings 26, which are covered with wire-gauze or other suitable material to prevent sudden drafts and to keep out rats and other animals. The front and back of the casing is also provided with suitable windows 27 to afford light to the interior.

A shield 28 is arranged at the opening 24 to prevent wind or drafts from entering the brooder, and it consists of a vertical wall and a horizontal top extending from the vertical wall to the adjacent wall of the casing.

The annular reservoir 9 is provided with a deflector-shield 29, consisting of a disk or plate supported upon and spaced from the inner wall 11, as clearly shown in Fig. 3. This disk or plate is interposed between the top of the inner wall 11 and the lower end of the pipe or flue 13, and it causes the heat and other products of combustion to flow outward and pass over the surface of the water of the reservoir.

What I claim is—

1. A brooder comprising a casing provided at its bottom with an opening designed to be placed over a heater, the reservoir provided with inner and outer walls forming a central flue, the outer wall being extended above the inner wall and having apertures, said reservoir being also provided with a top resting upon the upper edges of the outer wall and spaced from the inner wall, and a pipe or flue connected to and extending upward from the top of the reservoir, substantially as described.

2. A brooder comprising a casing provided at its bottom with an opening designed to be placed over a heater, the reservoir provided with inner and outer walls forming a central flue, the outer wall being extended above the inner wall and having apertures, said reservoir being also provided with a top resting upon the upper edges of the outer wall and spaced from the inner wall, a pipe or flue connected to and extending upward from the top of the reservoir, and the shield 29 supported by and spaced from the upper edges of the inner wall and interposed between the same and the pipe or flue, substantially as described.

3. A brooder comprising a casing provided at its bottom with an opening designed to be placed over a heater, the reservoir provided with inner and outer walls forming a central flue, the outer wall being extended above the inner wall and having apertures, said reservoir being also provided with a top resting upon the upper edges of the outer wall and spaced from the inner wall, a pipe or flue connected to and extending upward from the top of the reservoir, the shield 29 interposed between the inner wall and the pipe or flue and spaced from the former and from the top of the reservoir, the cylindrical wall arranged within the casing, and the fabric covering or diaphragm having a central opening to receive the pipe or flue and spaced from the reservoir, substantially as described.

In testimony whereof I have signed my name to this specification in the presence of two subscribing witnesses.

JOHN M. SONTAG.

Witnesses:
M. G. ALVERSON,
FRANK ROOSEWELL.